United States Patent [19]
Driedger et al.

[11] Patent Number: 6,006,598
[45] Date of Patent: Dec. 28, 1999

[54] METHOD AND APPARATUS FOR MONITORING A SYSTEM FOR CONTROLLING AN INTERNAL COMBUSTION ENGINE

[75] Inventors: Guenter Driedger, Oberriexingen; Bruno-Hans Dieners, Stuttgart, both of Germany

[73] Assignee: Robert Bosch GmbH, Stuttgart, Germany

[21] Appl. No.: 09/030,290

[22] Filed: Feb. 25, 1998

[30] Foreign Application Priority Data

Feb. 27, 1997 [DE] Germany ............................ 197 07 868

[51] Int. Cl.⁶ .................................................. G01M 15/00
[52] U.S. Cl. .......................................... 73/118.2; 123/396
[58] Field of Search .................................. 123/396, 399, 123/397, 398; 73/118.1, 118.2, 116, 119 R; 701/107

[56] References Cited

U.S. PATENT DOCUMENTS

| | | | |
|---|---|---|---|
| 4,092,970 | 6/1978 | Ball et al. ............................ | 123/198 D |
| 4,106,469 | 8/1978 | Dey ................................... | 123/198 DB |
| 4,359,894 | 11/1982 | Ikeura et al. ........................... | 73/118.2 |
| 4,519,361 | 5/1985 | Murakami ............................... | 123/399 |
| 4,637,361 | 1/1987 | Killen et al. .......................... | 73/119 R |
| 4,667,633 | 5/1987 | Stumpp et al. . | |
| 5,018,383 | 5/1991 | Togai et al. ........................... | 73/118.1 |
| 5,343,840 | 9/1994 | Wataya et al. .......................... | 123/399 |
| 5,367,997 | 11/1994 | Kawamura et al. ...................... | 123/399 |
| 5,419,293 | 5/1995 | Nagai ................................... | 123/336 |
| 5,562,080 | 10/1996 | Nishihara et al. ....................... | 123/399 |
| 5,578,749 | 11/1996 | Mogaki ................................. | 73/118.1 |
| 5,644,073 | 7/1997 | Matsuno et al. ........................ | 73/118.1 |
| 5,755,201 | 5/1998 | Knoss et al. ........................... | 123/396 |
| 5,906,184 | 5/1999 | Maruyama et al. ................ | 123/339.15 |

FOREIGN PATENT DOCUMENTS 33 43 481   6/1985   Germany .

Primary Examiner—Noah P. Kamen
Assistant Examiner—Hai Huynh
Attorney, Agent, or Firm—Kenyon & Kenyon

[57] ABSTRACT

A method and an apparatus for monitoring a system for controlling an internal combustion engine, in particular an auto-ignition internal combustion engine. In certain operating states, an adjuster for activating a throttle valve is activated in such a way that the throttle valve closes. A fault is recognized if the air quantity exceeds a threshold value.

7 Claims, 4 Drawing Sheets

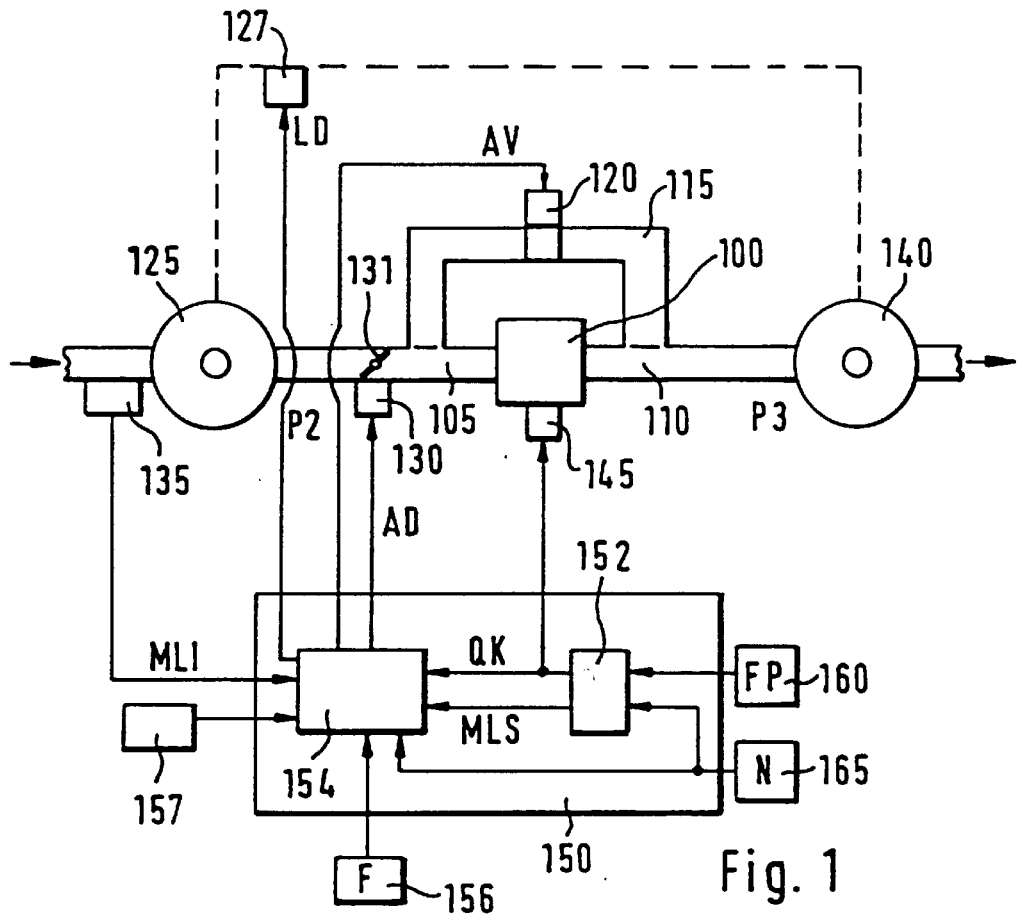
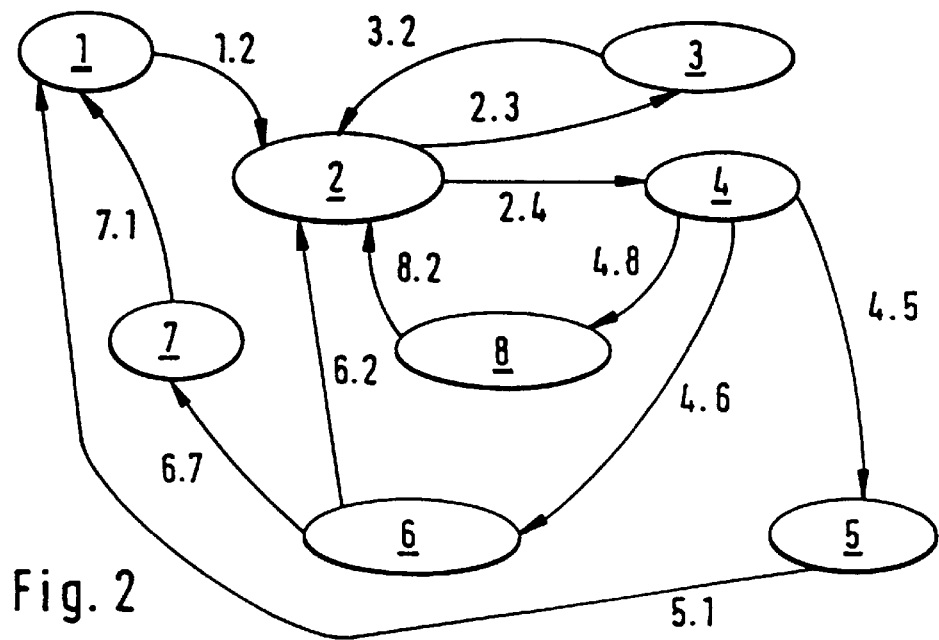
Fig. 1
Fig. 2

METHOD AND APPARATUS FOR MONITORING A SYSTEM FOR CONTROLLING AN INTERNAL COMBUSTION ENGINE

FIELD OF THE INVENTION

The present invention relates to a method and an apparatus for monitoring a system for controlling an internal combustion engine.

BACKGROUND INFORMATION

U.S. Pat. No. 4,667,633 (corresponding to German Patent Application No. 33 43 481) describes a method and an apparatus for monitoring a system for controlling an internal combustion engine. There, in the case of a diesel internal combustion engine, during coasting the control rod is activated in such a way that the quantity of fuel to be injected becomes zero. A check is made by means of a so-called needle movement sensor as to whether injections are still occurring. If no injection pulses are occurring, the system is fault-free.

German Patent Application No. 196 20 039 describes a system for controlling a diesel internal combustion engine in which the quantity of air supplied to the internal combustion engine can be controlled by means of a throttle valve. This system further comprises a means for controlling the exhaust gas re-circulation rate, and a device for compressing the air supplied to the internal combustion engine.

SUMMARY OF THE INVENTION

It is an object of the present invention to provide a method and an apparatus to check the function of a throttle valve that is used in a system for controlling an internal combustion engine, in particular, a diesel internal combustion engine. The throttle valve serves, on the one hand, as a safety device to interrupt the air supply, and serves, on the other hand, to meet emissions standards. In order to be able to guarantee reliable operation of the throttle valve, the latter is checked.

The procedure according to the present invention makes possible simple monitoring and checking of a throttle valve, in particular in coasting mode. No additional sensors or further components, above those normally supplied for a system for controlling an internal combustion engine, are required. Driving characteristics are not impaired, and the driver does not notice the testing.

BRIEF DESCRIPTION OF THE DRAWINGS

FIG. 1 shows a block diagram of a system for controlling an internal combustion engine according to the present invention.

FIG. 2 shows a graphic depiction of an automatic state system for use in a tester according to the present invention.

DETAILED DESCRIPTION OF THE INVENTION

Figure 3A:
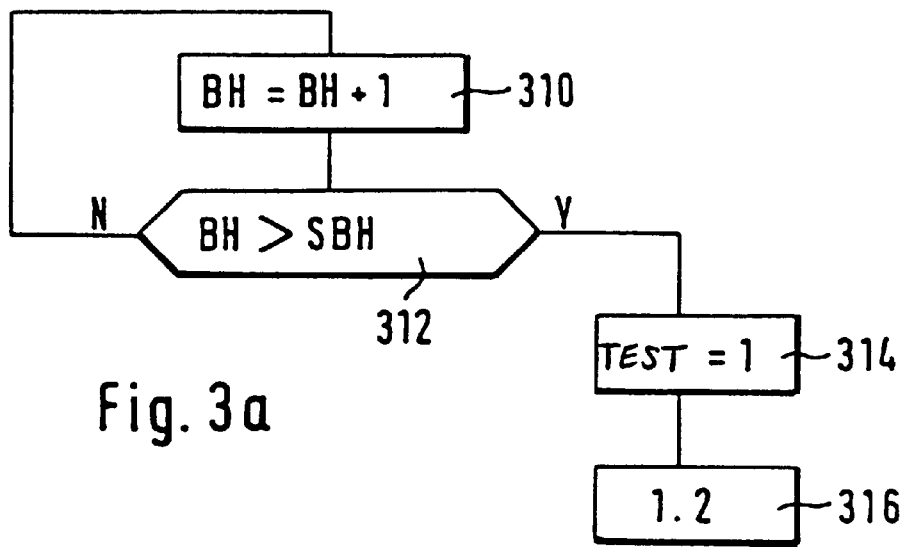
FIGS. 3a–3h depict flow diagrams which elucidate procedures according to the present invention.

FIG. 1 depicts an apparatus for controlling an internal combustion engine 100. Air passes via a supply line 105 to internal combustion engine 100, which emits exhaust gases via an exhaust line 110. A re-circulation line 115 connects exhaust line 110 to supply line 105. An exhaust gas re-circulation valve 120, which influences the quantity of exhaust gas recirculated and is referred to as the first actuator, is arranged in the re-circulation line.

A compressor 125 which compresses the supplied air can be arranged in the supply line. Compressor 125 is driven, via a connection drawn with dashed lines, by a turbine 140 arranged in exhaust line 110. Boost pressure can be influenced by means of a boost pressure adjuster 127. The quantity of outside air drawn in is varied by means of a throttle valve adjuster 130 which activates a throttle valve 131. Throttle valve adjuster 130 is also referred to as the second actuator.

The mass and/or volume of outside air MLI being supplied is sensed by means of a sensor 135 which is also referred to as the air quantity meter. This sensor senses either the air mass or the air volume, depending on the embodiment selected according to the present invention.

A control system 150 applies an activation signal AD to throttle valve adjuster 130, a signal QK to a fuel quantity adjuster 145, a signal AV to exhaust gas re-circulation valve 120, and a signal LD to boost pressure adjuster 127. Exhaust gas re-circulation valve 120 contains an electro-pneumatic converter which converts activation signal AV into a pneumatic force and thus into a specific position of actuator 120. Control system 150 analyzes the output signals of an engine speed sensor 165, an accelerator pedal position transducer 160, air quantity meter 135, the contents F of a fault memory 156, a coasting recognition system 157, and, optionally, further signals of further sensors.

The output signal FP of accelerator pedal position transducer 160 and the engine speed signal N of engine speed transducer 165 are processed by a fuel quantity controller 152 which then applies the activation signal QK to fuel quantity adjuster 145. In addition, fuel quantity controller 152 forwards a signal MLS concerning the air quantity set-point, and the fuel quantity signal QK, to an exhaust gas re-circulation controller 154. Exhaust gas re-circulation controller 154 also processes the output signal MLI of air quantity meter 135. Exhaust gas re-circulation controller 154 makes available signal AV and signal AD.

This device operates as follows: Outside air supplied via supply line 105 is compressed by compressor 125. The throttle valve can be activated, by means of throttle valve adjuster 130, in such a way that the air quantity being supplied passes in throttled or unthrottled fashion to internal combustion engine 100. The exhaust gases that are discharged via exhaust gas line 110 drive turbine 140, which in turn drives compressor 125.

A portion of the exhaust gas passes via re-circulation line 115 to supply line 105. By means of exhaust gas re-circulation valve 120, the cross section of the re-circulation line can be modified, and the proportion of re-circulated exhaust gas can thereby be established.

On the basis of driver input FP—which is sensed, for example by means of accelerator pedal position transducer 160—as well as engine speed N and optionally other operating parameters, fuel quantity controller 152 calculates an activation signal QK which defines the fuel quantity to be injected. Fuel quantity adjuster 145 is activated with this signal. In addition, fuel quantity controller 152 defines a set-point MLS for the outside air quantity. This set-point corresponds to the desired air quantity that is needed to combust the fuel quantity QK. Exhaust gas re-circulation controller 154 activates throttle valve adjuster 130 and exhaust gas re-circulation valve 120 in such a way that the fuel combusts in the internal combustion engine with minimum emissions.

In the cases of diesel injection systems, the throttle valve can be used not only to maintain the exhaust gas re-circulation rate (which serves in particular to improve exhaust emissions), but also as a shutoff apparatus. The throttle valve must be tested and monitored during vehicle operation to ensure that it is operational.

Figure 4:
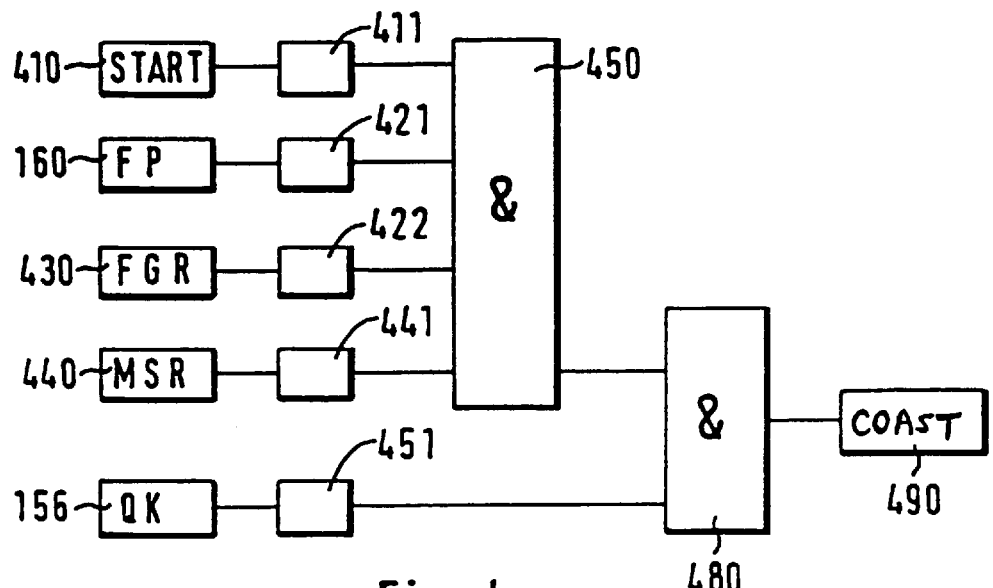
FIG. 4 shows a coasting recognition system according to the present invention.

According to the present invention, the throttle valve is tested during coasting. Coasting mode is detected by coasting detection system 157. The coasting detection system is depicted in more detail in FIG. 4. A start bit 410 indicates whether a starting operation is occurring. Said start bit 410 is set to zero when the starting operation is complete. This is the case, for example, when the engine speed exceeds a threshold (called the "start release speed"). The start bit is connected via a NAND element 411 to an AND gate 450.

Accelerator pedal 160 is also connected via a NAND element 421 to AND gate 450. If a vehicle speed regulator 430 is provided, its output is also connected via a NAND element 422 to AND gate 450. An output signal MSR of a block 440 is also connected via a NAND element 441 to AND gate 450. This signal MSR indicates whether an external quantity modification is present. An external quantity modification of this kind can, for example, be requested by a further control device, for example a transmission controller, an automatic slip controller, and/or a vehicle dynamics controller.

A signal exists at the output of AND gate 450 if the following conditions are met: start bit 410 is not set, the accelerator pedal is in the zero position, a vehicle speed regulator (if present) is also defining a zero quantity, and no external quantity modifications are present.

The output of AND gate 450 passes to a second AND gate 480. The signal QK of fuel quantity definer 152 passes via a NAND element 451 to second AND gate 480. A signal exists at the output of second AND gate 480 if the fuel quantity QK to be injected is zero, and if a signal exists at the output of AND gate 450. In that case coasting bit 490 is set to 1. The coasting condition is met, and coasting bit 490 is set, if a start bit is not set, the accelerator pedal is in the zero position, a vehicle speed regulator (if present) is also defining a zero quantity, no external quantity modifications are present, and the quantity QK to be injected has a value of zero.

In addition, the throttle valve test takes place only if no faults are present in the pertinent system elements. This means that a fault memory 156 must not be set.

If these test conditions are met, the throttle valve test can then theoretically be performed. The throttle valve test is performed using an "automatic state system" having eight states, which are depicted in FIG. 2. The individual states are marked with ellipses, and labeled with numbers from 1 to 8. The transitions from one state to another state are labeled with pairs of numbers, the number to the left of the period indicating the initial state, and the number to the right of the period indicating the final state.

A "Normal" state, in which an elapsed time meter is running, is labeled 1. When the elapsed time meter reaches a certain threshold BH, a test marker is set. Once this is set, the system transitions into the "Ready to test" state, labeled 2.

In the "Ready to test" state, the test marker is set. If the coasting conditions are met and no faults are present, the system transitions into the next state, "Start test."

In the "Start test" state, which is labeled 4, exhaust gas re-circulation valve 120 is "frozen" in its current state or set to a default value. This default value is selected so that the adjusters involved assume a defined position in which an unequivocal conclusion as to the state of the monitored elements can be reached. The procedure is the same in the case of boost pressure adjuster 127. Throttle valve 130 is closed, and air mass MLI is then measured. If the latter is below a threshold value, the test is terminated and the system goes into the "Throttle valve OK" state. If the air mass is above the threshold value, the system goes into the "Throttle valve temporarily defective" state. If, during the test period, the coasting conditions are no longer met or a fault occurs, the test is terminated and the system goes into the "Test terminated" state.

In the "Throttle valve OK" state, which is labeled 5, the test marker is unset and the adjusters are reset via a ramp to the current values. The system goes into the "Normal" state, labeled 1.

In the "Test terminated" state, which is labeled 8, the adjusters are set back, preferably via a ramp, to the current values, and the system goes into the "Ready to test" state.

In the "Throttle valve temporarily defective" state, which is labeled 6, the adjusters are set back, preferably via a ramp, to the current values. In addition a counter, which can count up to a defined value of, for example, 5, is started. When the counter reaches the defined value, the system goes into the "Throttle valve defective" state, which is labeled 7. If the counter remains below the threshold, the system goes into the "Ready to test" state, which is labeled 2.

In the "Throttle valve defective" state, which is labeled 7, if the counter arrives at the defined value, a display, in particular a system light, is activated to indicate a corresponding defect. The adjusters are also set to the current values. The test marker is correspondingly also set back. The system transitions into the "Normal" state.

If a fault bit F is set, the system goes into the "Test not possible" state, which is labeled 3. This state persists until the fault bit F is erased and the system goes into the "Ready to test" state, which is labeled 2.

FIGS. 3a–3h depict the various states as flow diagrams. The "Normal" state is depicted in FIG. 3a. In a first step 310, an elapsed time meter BH is incremented by 1. The subsequent query 312 checks whether the elapsed time meter has exceeded a defined threshold value SBH. If not, step 310 then follows again. If so, instep 314 a test marker TEST is set at 1. Then in step 316, a transition is made from the "Normal" state 1 to the "Ready to test" state 2.

Figure 3B:
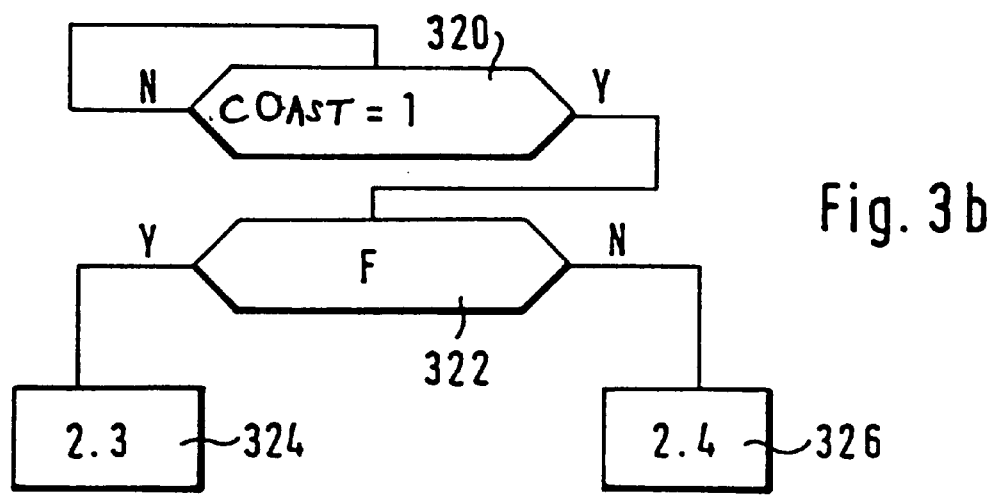

In the "Ready to test" state 2, which is depicted in FIG. 3b, a first query checks whether coasting mode is present, e.g., whether coasting bit 490 is set at 1. This is checked by checking a coasting bit to determine whether it has, for example, the value of 1. If not, query 320 is performed again. If so, there follows query 322, which checks whether fault memory 156 is set at F.

The fault memory is set if an adjuster participating in the test is defective. This involves faults in boost pressure adjuster 127, exhaust gas re-circulation valve 120, and/or throttle valve adjuster 130. A test cannot be performed if there is a defect in these areas.

If there is a defect, in step 324 the system transitions into state 3, "Test not possible." If no faults are present, the system transitions, in step 326, into state 4, "Start test."

Figure 3C:
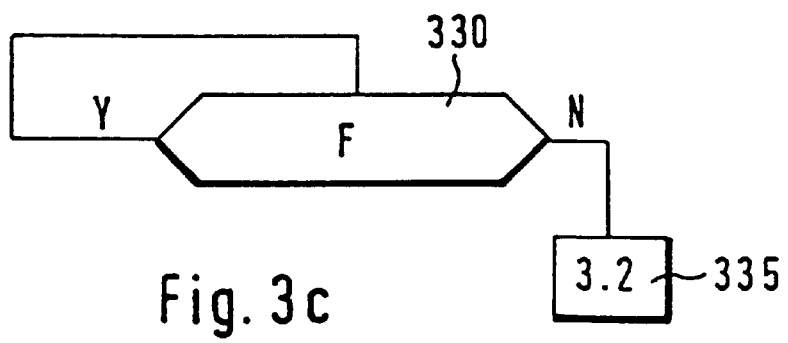

The "Test not possible" state is depicted in FIG. 3c. A query 330 continuously checks whether fault memory 156 is set to F; if so, query 330 is again performed. If no faults are present, the system transitions in step 335 into the "Ready to test" state.

Figure 3D:
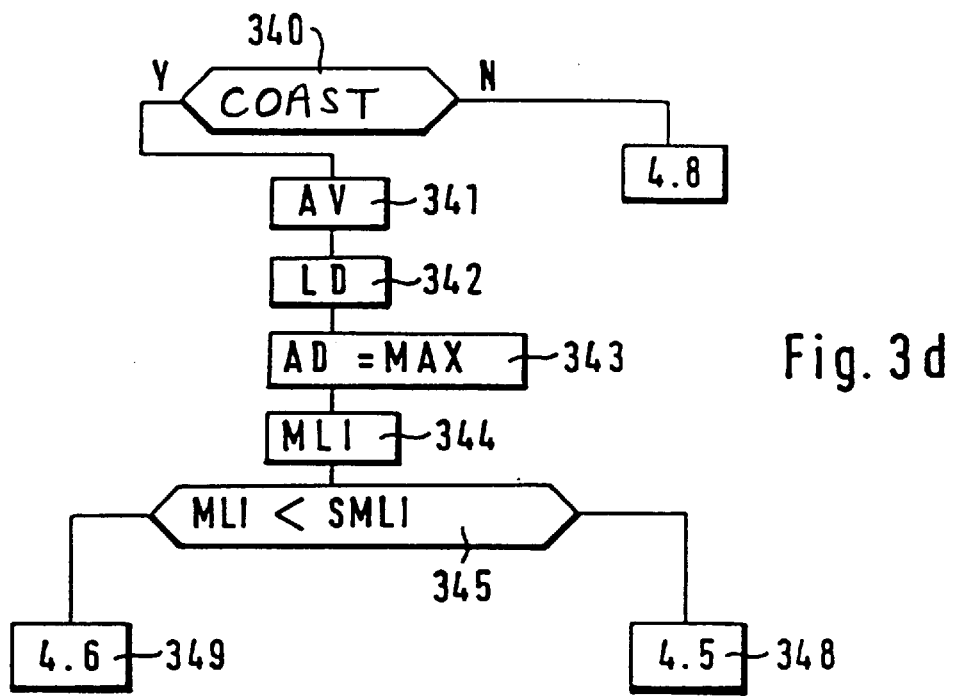

The "Start test" state is depicted in FIG. 3d. In a first query 340, a continuous check is made as to whether coasting mode is present, i.e., whether coasting bit 1 is set to 1. If not, then in step 347 the system transitions into state 8, "Test terminated." If coasting mode is present, then in step 341 exhaust gas re-circulation adjuster 120 is frozen in its existing state or set to a default value. This means that activation signal AV for exhaust gas re-circulation adjuster 120 is stored in a memory and held at that value. A corresponding sequence occurs in step 342 for the activation signal of boost pressure adjuster 127. This means that exhaust gas re-circulation adjuster 120 and the boost pressure adjuster 127 remain in the positions they had reached, even if operating conditions change to the extent that a different exhaust gas recirculation rate and/or a different boost pressure need to be established.

In the subsequent step 343, throttle valve 130 is activated with a signal MAX such that it transitions into its closed state. In the subsequent step 344, the air quantity MLI supplied to the internal combustion engine is sensed by sensor 135. The query 345 checks whether the value MLI is less than a threshold value SMLI. This air mass value SMLI is selected so that, as a rule, it is not reached when the throttle valve is closed. This air mass value SMLI can only be reached if the throttle valve does not close completely. If the value of MLI is less than the threshold value, the system then transitions, in step 348, into state 5, "Throttle valve OK." If the value is greater than or equal to the threshold value, this indicates that the throttle valve is not completely closed. In that case the system transitions, in step 349, into state 6, "Throttle valve temporarily defective."

Figure 3E:
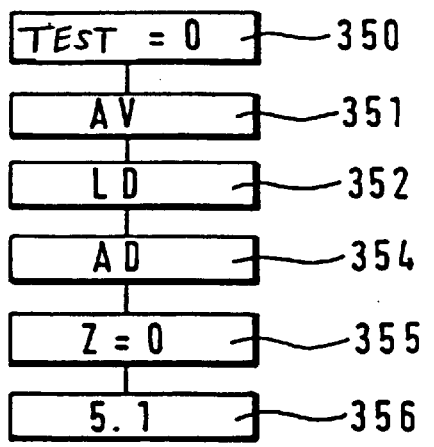

The "Throttle valve OK" state, which is labeled 5, is depicted in FIG. 3e. In a first step 350, the test marker is reset to zero. Then, in step 351, the adjuster for the exhaust gas re-circulation rate is acted upon by a signal AV which corresponds to the instantaneous value. The same takes place correspondingly in step 352 for boost pressure adjuster 127, and in step 354 for signal AD of throttle valve adjuster 130. In step 355, counter Z is also set to zero. This is then followed by the transition into the "Normal" state.

Figure 3F:
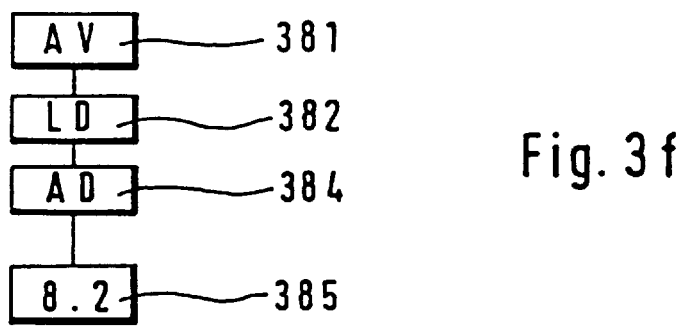

State 8, "Test terminated," is depicted in FIG. 3f. By analogy with steps 351 to 354, in steps 381, 382, and 384 the activation signals AV, LD, and AD for the relevant adjusters are set to their current value. In step 385 the system then goes into state 2, "Ready to test."

Figure 3G:
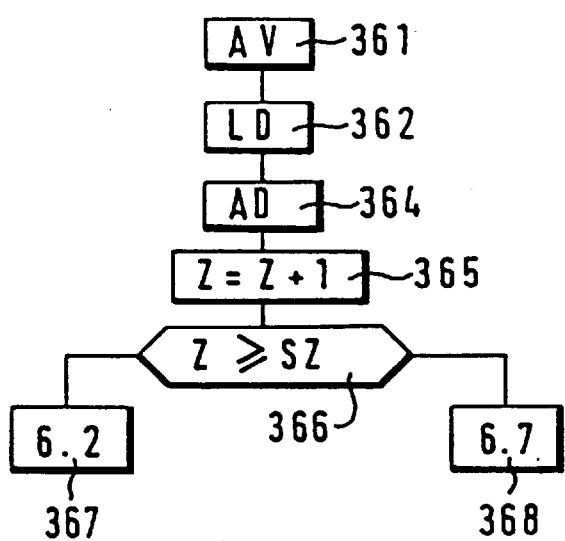

FIG. 3g depicts state 6, "Throttle valve temporarily defective." In steps 361, 362, and 364, the activation signals AV, LD, and AD for the adjusters are reset to their current values. In addition, in step 365 counter Z is incremented by 1. The subsequent query 366 checks whether the contents of counter Z are greater than or equal to a threshold value SZ. If so, the system transitions, in step 368, into state 7, "Throttle valve defective." This takes place if the throttle valve defect has occurred several times. If query 366 recognizes that the count SZ has not yet been reached, the system transitions into state 2, "Ready to test." This means that if the fault occurs only once or a few times, the system transitions directly into the "Ready to test" state. The throttle valve adjuster is tested again the next time the coasting mode occurs.

Figure 3H:
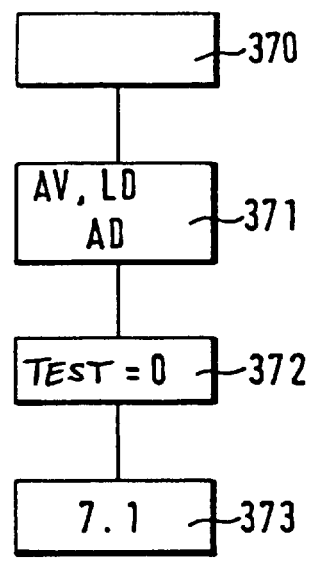

FIG. 3h depicts state 7, "Throttle valve adjuster defective." In a first step 370, an indicating means, in particular a system light, is activated in such a way that it indicates that throttle valve 131 and/or its adjuster 130 are defective. In the subsequent step, the activation signals AV, LD, and AD are set to their current values. In the subsequent step 372, the test marker TEST is reset to zero. Then in step 373 the system transitions into state 1, "Normal."

The transition from the stored values to the current values preferably takes place via a ramp and not abruptly. This means that the adjuster is brought, in accordance with a constant function, from its stored position into the current position which corresponds to the current operating conditions, which may possibly have changed.

This procedure results in a variety of process sequences. If the throttle valve is not defective, the sequence is as follows: beginning from the "Normal" state, a transition occurs in defined time intervals, which are sensed by means of an elapsed time meter BH, into the "Ready to test" state. If a coasting mode begins after expiration of the defined time threshold, the test is performed and the system transitions back into the "Normal" state. If a test termination occurs because coasting mode is no longer present or because some other fault has occurred, the system transitions immediately into the "Ready to test" state, and the test is restarted as soon as coasting mode is once again present.

If a defect occurs in the area of the throttle valve adjuster, the sequence is as follows: After expiration of the waiting period of the elapsed time meter, the system transitions into the "Ready to test" state. When coasting mode begins, the test is performed and the fault is detected. The first time the fault is detected, the system again goes into the "Ready to test" state, and the test is performed again the next time coasting mode occurs. This continues until a defined number of fault states has been detected. If the fault occurs several times, a fault is ultimately recognized and that fact is indicated to the driver. If a fault-free state is detected in the meantime, the system transitions back into its "Normal" state and the fault counter is reset.

Testing can be interrupted at any time; the system then transitions into the "Ready to test" state and the test is performed again during the next coasting mode.

Once the test has been completed with detection of a fault-free state, the system goes into "Normal" mode and in the next coasting mode the test is not performed until a defined elapsed time value has been reached. If the test is terminated, or if a fault is detected, in the next coasting mode the system transitions back into state 2, "Ready to test."

What is claimed is:

1. A method for monitoring a system for controlling an internal combustion engine, comprising the steps of:
    activating an adjuster for a throttle valve, in at least one operating state of the engine, such that the adjuster attempts to close the throttle valve;
    sensing a variable indicative of an air quantity after the adjuster has attempted to close the throttle valve; and
    recognizing a fault if the sensed variable exceeds a threshold value.

2. The method according to claim 1, wherein the steps are performed in a coasting mode.

3. The method according to claim 1, wherein a plurality of operating states occur when the steps are performed.

4. The method according to claim 1, wherein the steps are repeated at defined time intervals.

5. The method according to claim 2, wherein the steps are interrupted if the coasting mode is no longer present.

6. The method according to claim 1, wherein the fault is recognized only if the variable does not assume an expected value a preselected plural number of times.

7. An apparatus for monitoring a system for controlling an internal combustion engine, comprising:
    an adjuster for activating a throttle valve;

means for activating the adjuster, in at least one operating state of the engine, such that the adjuster attempts to close the throttle valve;

means for sensing a variable indicative of an air quantity after the adjuster attempts to close the throttle valve; and means for recognizing a fault if the sensed variable exceeds a threshold value.

* * * * *